No. 688,671. Patented Dec. 10, 1901.
H. E. NASON.
MEANS FOR LOCKING AND SEALING MONEY BAGS.
(Application filed Mar. 16, 1901.)
(No Model.)
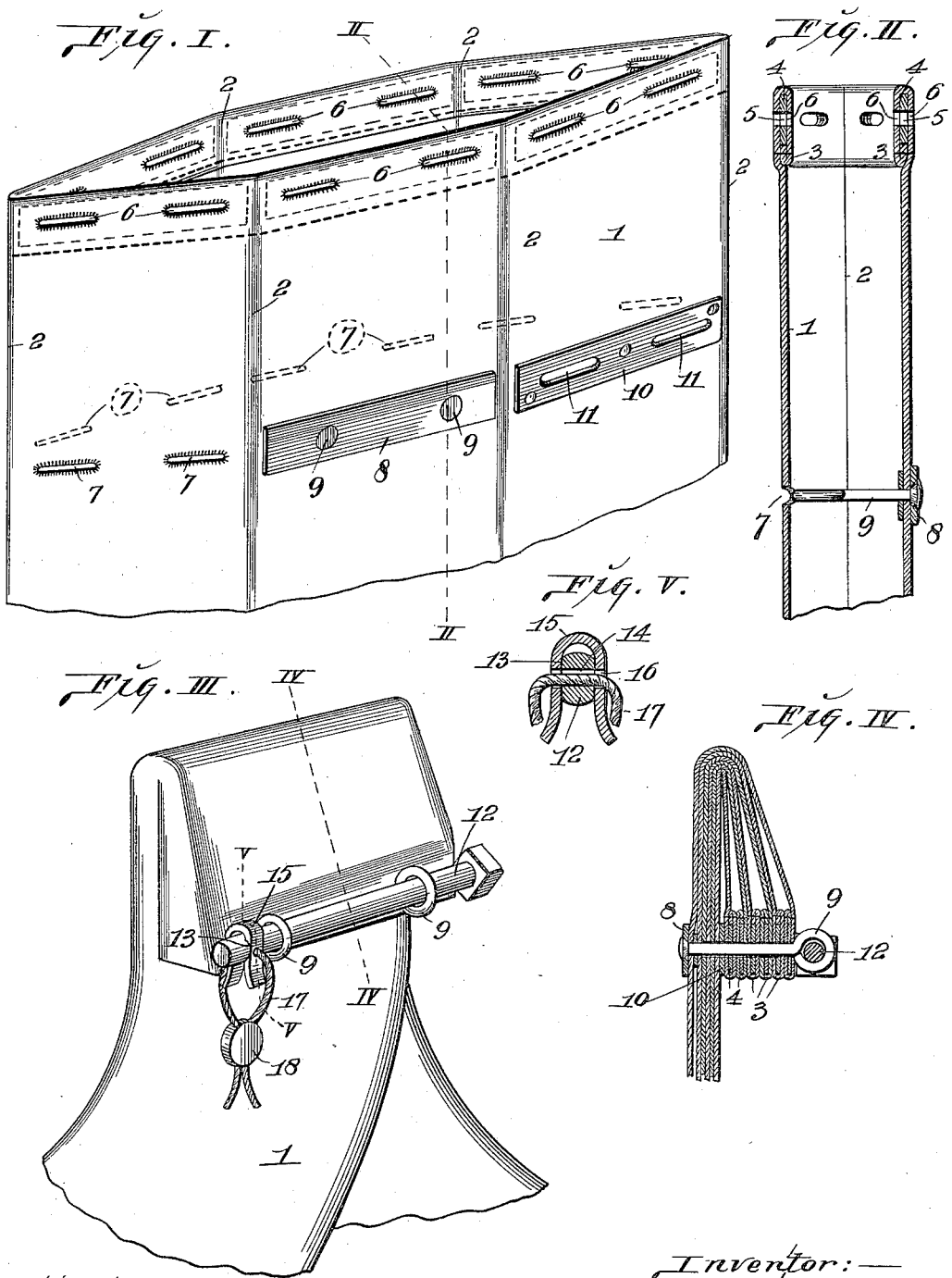
Inventor:—
H. E. Nason.
By Wright Bro
Atty's.
Attest:—
M. F. Smith
E. S. Knight

UNITED STATES PATENT OFFICE.

HERBERT E. NASON, OF ST. LOUIS, MISSOURI.

MEANS FOR LOCKING AND SEALING MONEY-BAGS.

SPECIFICATION forming part of Letters Patent No. 688,671, dated December 10, 1901.

Application filed March 16, 1901. Serial No. 51,519. (No model.)

*To all whom it may concern:*

Be it known that I, HERBERT E. NASON, a citizen of the United States, residing in the city of St. Louis, in the State of Missouri, have invented certain new and useful Improvements in Means for Locking and Sealing Money-Bags, of which the following is a full, clear, and exact description, reference being had to the accompanying drawings, forming part of this specification.

My invention relates to a means whereby the mouths of money-bags may be effectually closed and sealed to retain the contents thereof against unauthorized opening.

The invention consists in features of novelty hereinafter fully described, and pointed out in the claims.

Figure I is a perspective view illustrating my improvement. Fig. II is a sectional view taken on the line II II, Fig. I. Fig. III is a perspective view showing the bag closed and secured. Fig. IV is a sectional view taken on the line IV IV, Fig. III. Fig. V is a sectional view taken on the line V V, Fig. III.

1 designates the bag, the mouth of which is adapted to be folded on the lines 2. (See Fig. I.) The upper edge of the bag is folded over, as seen at 3 in Figs. II and IV and dotted lines, Fig. I, so as to form pockets within the folds, and within said pockets are strips or bars 4 of metal or other suitable material, that are provided with elongated openings 5. In the bag 1, coincident with the openings 5, are slits 6, the said elongated openings and slits being adapted to receive parts to be hereinafter referred to. Throughout the bag 1, on a line beneath the edge of the mouth of the bag, are a series of slits 7, and in line with the slits 7 is a bar 8, that carries rotatable eyebolts 9, which project into the interior of the bag when the bag is open, as seen in Fig. II, and in line with said bar 8 is a bar 10, containing apertures 11.

In closing the bag the mouth portion thereof is folded on the lines 2, so as to bring the slits 7 in the bag and the apertures 11 in the bar 10 into coinciding positions and the eyebolts 9 into line with said slits and apertures, so that said eyes may be passed therethrough. In folding the bag, as stated, the slits 6 and the elongated openings 5 in the strips or bars 4 are also brought into coinciding positions, as will be apparent, the bars or strips at such time occupying assembled positions, as seen in Fig. IV. At this time the eyebolts 9, which are swiveled, as seen in Fig. II, are passed first through the series of slits 7 and then through the apertures 11 in the bar 10. The mouth of the bag is then folded over, as seen in Fig. III, and the eyebolts 9, which protrude past the bar 10, are inserted through the assembled bars or strips 4, passing through the elongated openings therein and the coinciding slits 6 in the bag. The eyebolts 9 are then rotated into the position seen in Figs. III and IV, which places them at right angles to the position assumed in passing them through the openings, slits, and apertures in the parts enumerated.

12 designates a pin that is passed through the eyebolts 9 to retain them in place after they have been passed through the bag, as described, the said pin being notched or grooved, as seen at 13, Fig. III, and having applied thereto a spring-clip 15. The pin 12 is provided with an aperture 14, and the clip 15 contains apertures 16, the said apertures being designed to coincide when the clip is applied to the pin and to receive a cord 17, to which the seal 18 is applied to secure the pin 12 against unauthorized removal without detection.

I claim as my invention—

1. In a device of the character described, the combination of a bag provided with a series of slits at the edge of its mouth, bars or strips positioned in said bag at its mouth and having openings coincident with said slits, said bag being provided with a series of slits beneath the mouth thereof, a bar secured to the bag, and rotatable eyebolts carried by said bar adapted for passage through both of said series of slits and said bars or strips, and means for holding said eyebolts from rotation and retraction through the bag after being passed therethrough, substantially as described.

2. In a device of the character described, the combination of a bag, a series of bars located at the mouth thereof and provided with openings, said bag being provided beneath its mouth with a series of slits, a bar affixed to said bag, rotatable eyebolts carried by said bar and adapted for passage through said slits and bars, an apertured bar located in line with said eyebolt-carrying bar and through which said eyebolts are passed, and a retaining-pin arranged in said eyebolts to hold them from rotation and retraction for holding said eyes from retraction, substantially as described.

3. In a device of the character described, the combination with a bag provided with slits or openings, eyes affixed to said bag and adapted for passage through said slits or openings, a pin arranged in said eyes, a clip applied to said pin, said clip and pin being provided with apertures adapted to receive a seal-cord, substantially as described.

HERBERT E. NASON.

In presence of—
E. S. KNIGHT,
N. V. ALEXANDER.